United States Patent [19]

Uchida

[11] Patent Number: 4,865,147
[45] Date of Patent: Sep. 12, 1989

[54] HYDRAULIC FLUID CIRCUIT FOR VARIABLE ASSIST POWER STEERING SYSTEM

[75] Inventor: Koh Uchida, Sagamihara, Japan

[73] Assignee: Nissan Motor Company, Limited, Yokohama, Japan

[21] Appl. No.: 138,345

[22] Filed: Dec. 28, 1987

[30] Foreign Application Priority Data

Dec. 27, 1986 [JP] Japan .................... 61-313517

[51] Int. Cl.⁴ .............................. B62D 5/06
[52] U.S. Cl. .................... 180/141; 180/142
[58] Field of Search .......... 180/141, 142, 143, 132, 180/146, 149

[56] References Cited

U.S. PATENT DOCUMENTS

| | | | |
|---|---|---|---|
| 4,465,098 | 8/1984 | Bacardit | 137/625.21 |
| 4,512,238 | 4/1985 | Bacardit | 91/370 |
| 4,561,516 | 12/1985 | Bishop et al. | 180/142 |
| 4,561,521 | 12/1985 | Uffy | 180/142 |
| 4,565,115 | 1/1986 | Bacardit | 91/375 |
| 4,570,735 | 2/1986 | Duffy | 180/142 |
| 4,619,339 | 10/1986 | Futaba et al. | 180/143 |
| 4,632,204 | 12/1986 | Honaga et al. | 180/142 |
| 4,669,568 | 6/1987 | Kervagoret | 180/142 |
| 4,672,885 | 6/1987 | Kervagoret | 91/450 |

FOREIGN PATENT DOCUMENTS

| | | | |
|---|---|---|---|
| 0041887 | 12/1981 | European Pat. Off. | |
| 53560 | 6/1982 | European Pat. Off. | 180/132 |
| 2568843 | 2/1986 | France . | |
| 47-30039 | 11/1972 | Japan . | |
| 54-15232 | 2/1979 | Japan . | |
| 56-38430 | 9/1981 | Japan . | |
| 56-174363 | 12/1981 | Japan . | |
| 57-30663 | 2/1982 | Japan . | |
| 58-156459 | 9/1983 | Japan . | |
| 161667 | 9/1983 | Japan | 180/142 |
| 1073 | 1/1985 | Japan | 180/142 |
| 61-43229 | 9/1986 | Japan . | |
| 257365 | 11/1986 | Japan | 180/141 |

Primary Examiner—Kenneth R. Rice
Attorney, Agent, or Firm—Foley & Lardner, Schwartz, Jeffery, Schwaab, Mack, Blumenthal & Evans

[57] ABSTRACT

A control valve includes valve elements relatively displaceable in response to a predetermined variable (e.g., a steering torque) to define therebetween two parallel fluid flow paths connected between a fluid source and a fluid reservoir to produce pressure difference in a power cylinder. The control valve comprises a bypass path provided with variable flow orifice means for providing a throttle of fluid flow of the bypass path in response to the predetermined variable and an externally controlled variable flow orifice valve that has an orifice area variable in response to a second predetermined variable which is different from the first predetermined variable.

18 Claims, 10 Drawing Sheets

HYDRAULIC FLUID CIRCUIT FOR VARIABLE ASSIST POWER STEERING SYSTEM

RELATED APPLICATIONS

The following two U.S. patent applications have been already filed and assigned to the same assignee of the present application.

(1) U.S. patent application Ser. No. 044,065, filed on Apr. 29, 1987, now pending.

(2) U.S. patent application Ser. No. 102,412, filed on Sept. 9, 1987, now pending.

The following four U.S. patent applications have been concurrently filed and assigned to the same assignee of the present application.

(3) U.S. patent application Ser. No. 07/138,480, filed on Dec. 28, 1987, claiming priority based on Japanese patent Application No. 61-313519 with a filing date of Dec. 27, 1986.

(4) U.S. patent application Ser. No. 07/138,490, filed on Dec. 28.1987, claiming priority based on Japanese Patent Application No. 61-313521 with a filing date of Dec. 27, 1986.

(5) U.S. patent application Ser. No. 07/138,402, filed on Dec. 28, 1987 claiming priority based on Japanese Patent Application No. 61-313520 with a filing date of Dec. 27, 1986.

(6) U.S. patent application Ser. No. 07/138,479, filed on Dec. 28, 1987 claiming priority based on Japanese Patent Application No. 61-313518 with a filing date of Dec. 27, 1986.

BACKGROUND OF THE INVENTION

The present invention relates to a variable assist power steering system for vehicles and more particularly to a hydraulic control valve for use in a variable assist power steering system where it is desirable to have the degree of power assistance change with vehicle speed or some other variable related to the mode of operation of the vehicle.

A power assisted steering system can be characterized as operating under three driving conditions. Firstly during straight ahead driving at medium to high speeds, the power requirements on the steering system are extremely low and the degree of power assistance provided by the steering gear should be correspondingly minimized to permit the feedback of road "feel" from the tires to the driver. Secondary during medium and high speed passing and cornering maneuvers, a progressive increase in the level of power assistance with driver input torque is desirable. Nevertheless moderate driver input torques should still be maintained in order that the driver can feel adequately the dynamic state of the vehicle. Thirdly, and lastly, during low speed or parking maneuvers, the power requirements on the steering system may be large and fidelity of the steering system in terms of transmitting road feel is of little importance. Under these circumstances it is generally desirable to offer large degrees of power assistance, thereby minimizing the input torque required to be furnished by the driver.

The demands for optimum valve characteristics during the above three driving conditions conflict. Attempts have been made in the past to avoid the conflicting demands of the first and third driving conditions, namely the need to achieve a low level assistance for high to medium speed on-center driving while having high levels of assistance for low speed and parking maneuvers, by exploiting the fact that, for most valves, the degree of assistance varies with the flow of oil. For example, in one such widely used system, the power steering pump is caused to reduce the flow of oil as vehicle speed increases. However, this adversely affects valve performance in the second driving condition above, namely medium to high speed passing and cornering maneuvers, where progressive valve response is impaired due to the low oil flow. Also, in the event that such a steering maneuver requires rapid turning of the steering wheel, the lower pump flow may be inadequate, rendering the power assistance momentarily inoperative. In another known system disclosed in JP 56-38430 B2, a bypass path with a variable flow valve is connected between both ends of the power cylinder and the variable flow valve is controlled in response to vehicle speed to cause bypass flow to increase as vehicle speed increases. However, this adversely affects valve performance in the second driving condition above, namely medium to high speed passing and cornering maneuvers, where progressive valve response is impaired due to the low gain.

The most satisfactory method of matching valve performance in all three of the abovementioned conditions is modulating the valve characteristic with vehicle speed. A system which provides for better modulation of power assistance with vehicle speed is disclosed in U.S. Pat. No. 4,561,521 and can be seen to employ a rotary valve with primary and secondary valve portions. A speed sensitive valve is used to control oil flow from the pump to the secondary valve portion so that at high vehicle speeds a parallel flow path is provided between the rotary valve and the pump as oil is distributed to both primary and secondary valve portions. At low vehicle speeds, the speed sensitive valve restricts the flow of oil from the pump to the secondary valve portion. During parking maneuvers, the primary valve portion acts alone in the normal manner and the secondary valve portion is vented and not fed with oil from the pump. A change from a high level of power assist to a low level of power assist, and conversely, is effected by a variable force solenoid which is used to establish a parallel flow path from the pump to the secondary valve portion through a variable flow orifice. A speed sensing module controls the solenoid to open and close a variable orifice valve thus providing gradual changes in the level of power assist as the vehicle speed changes. The rotary valve used in this power steering system includes a valve housing having a circular opening which receives a valve sleeve. Positioned within the valve sleeve is an inner valve. The inner valve is formed with a primary set of longitudinal grooves forming a primary valve section, and also with a secondary set of longitudinal grooves forming a secondary valve section. The primary and secondary sets of longitudinal grooves register with primary and secondary sets of internal grooves formed in the internal wall of the valve sleeve, respectively. The primary and secondary sets of internal grooves are difficult to machine and require skilled labour because they have to be formed in the cylindrical internal wall of the valve sleeve with high precision. This has caused increased production steps and manufacturing cost.

SUMMARY OF THE INVENTION

The object of the present invention is to improve a variable assist power steering system which is free from the problem above.

The specific object of the present invention is to provide a hydraulic fluid circuit for a variable assist power steering system which can be embodied with valve grooves easy to machine.

According to the present invention, a variable assist power steering system comprises a control valve including valve elements relatively displaceable in response to a predetermined variable to define therebetween two parallel fluid flow paths connected between the fluid source and the fluid reservoir. The control valve is provided with a bypass path including variable flow orifice means for providing a throttle of fluid flow through the bypass path and an externally controlled variable flow orifice valve that has an orifice area variable in response to a second predetermined variable which is different from the first mentioned predetermined variable.

DETAILED DESCRIPTION OF THE INVENTION

Figure 1:
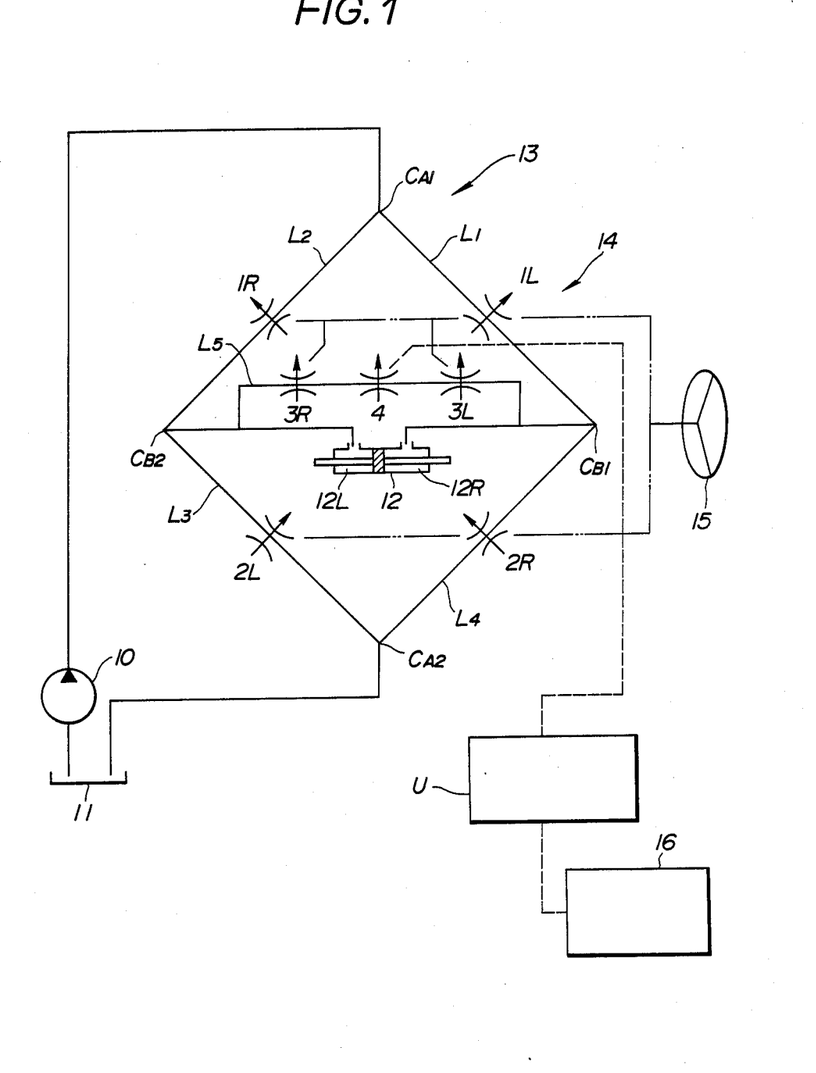
FIG. 1 is a circuit diagram of a first embodiment of the present invention.

FIG. 1 shows a hydraulic fluid circuit diagram which includes an oil pump 10 as a hydraulic fluid source, a tank 11 as a fluid reservoir, and a control valve 13 employing a fluid flow distributor circuit 14 of the open center type. Also shown are a steering wheel 15, a vehicle speed sensor 16, and a control unit U.

In the conventional manner, the fluid flow distributor circuit 14 includes two parallel flow paths $L_2$-$L_3$ and $L_1$-$L_4$ connected between a pump fluid supply port $C_{A1}$ and a fluid return port $C_{A2}$. The flow path $L_2$-$L_3$ has a cylinder connection port $C_{B2}$ connected to a cylinder chamber 12L of a power cylinder 12, while the other flow path $L_1$-$L_4$ has a cylinder connection port $C_{B1}$ connected to a cylinder chamber 12R of the power cylinder 12. Arranged in the upstream portion $L_2$ and the downstream portion $L_3$ of the flow path $L_2$-$L_3$ are two variable flow orifices 1R and 2L, respectively. Similarly, arranged in the upstream portion $L_1$ and the downstream portion $L_4$ of the other flow path $L_1$-$L_4$ are two variable flow orifices 1L and 2R, respectively. These variable flow orifices 1R, 2L, 1L and 2R are operatively associated with the steering wheel such that when the steering wheel 15 is in the central rest position, they are opened to provide unrestricted parallel flows of fluid between the fluid supply port $C_{A1}$ and the fluid return port $C_{A2}$. Turning the steering wheel 15 clockwise from the central rest position causes the variable flow orifices 1R and 2R to decrease their orifice areas as steering torque increases with the other two variable flow orifices 1L and 2L kept opened, and turning the steering wheel 15 counterclockwise from the central rest position causes the variable flow orifices 1L and 2L to decrease their orifice areas as steering torque increases with the other two variable flow orifices 1R and 2R kept opened.

In order to vary flow of fluid passing through the flow path $L_2$-$L_3$, a bypass path $L_5$ is connected between the cylinder connection ports $C_{B1}$ and $C_{B2}$. The bypass path $L_5$ includes variable flow orifices 3L and 3R, and an externally controlled variable flow orifice valve 4 which is controlled by the control unit U in response to the output signal of the vehicle speed sensor 16. The variable flow orifices 3L and 3R are operatively associated with the steering wheel 15 such that they are opened when the steering wheel 15 is in the central rest position. Turning the steering wheel 15 clockwise from the central rest position causes the variable flow orifice 3R to decrease its orifice area as steering torque increases with the other variable flow orifice 3L kept opened. Turning the steering wheel 15 counterclockwise from the central rest position causes the variable flow orifice 3L to decrease its orifice area as the steering torque increases with the other variable flow orifice 3R kept opened.

Figure 2A:
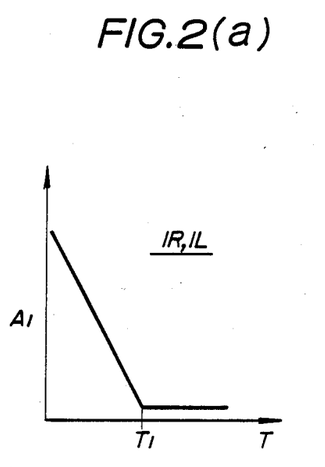
FIGS. 2(a) and 2(b) are diagrammatic chart showing how orifice areas of variable flow orifices vary against a steering input torque (T)
Figure 2B:
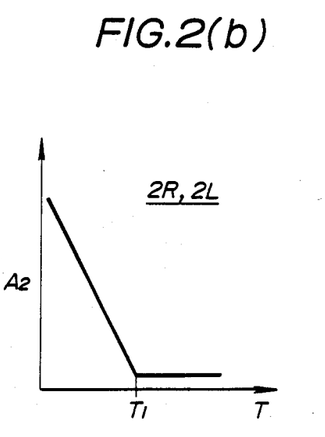
Figure 2C:
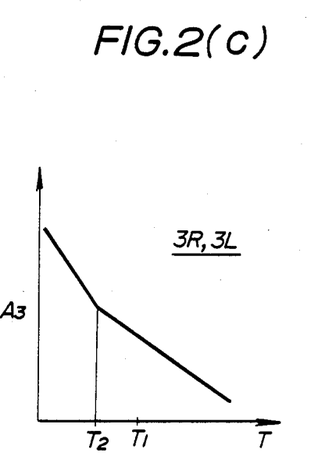
FIG. 2(c) is a diagrammatic chart showing how orifice area of variable flow orifice varies against steering torque.
Figure 2D:
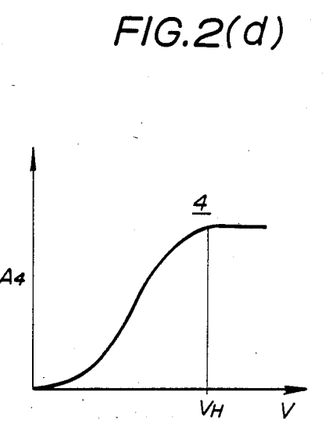
FIG. 2(d) is a diagrammatic chart showing how orifice area of an externally controlled variable flow orifice valve varies against vehicle speed.

FIG. 2(a) shows how the orifice area ($A_1$) of the variable flow orifice 1R or 1L decreases as the steering torque (T) increases. FIG. 2(b) shows how the orifice area ($A_2$) of the variable flow orifice 2R or 2L decrease as the steering torque T increases. FIG. 2(c) shows how the orifice area ($A_3$) of the variable flow orifice 3R or 3L decreases as the steering torque increases. Lastly, FIG. 2(d) shows how the orifice area ($A_4$) of the externally controlled variable flow orifice valve 4 increases as vehicle speed (V) increases. The variation characteristics shown in FIGS. 2(a), 2(b), 2(c), and 2(d) will be referred to again later.

Figure 3:
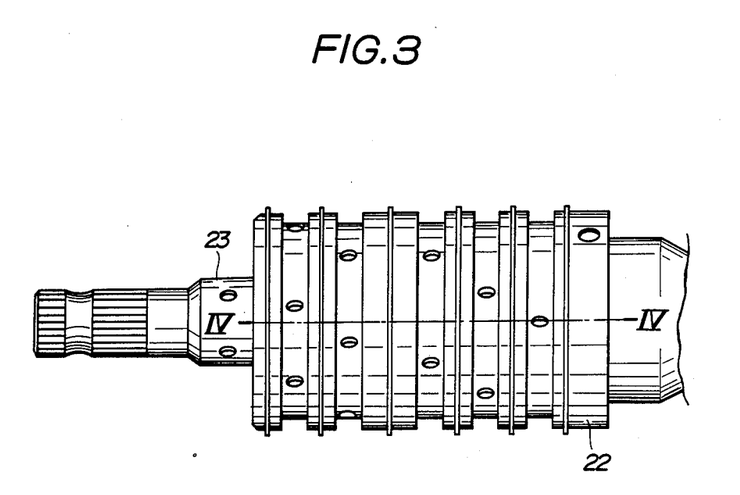
FIG. 3 is a side elevation of a valve sleeve with an inner valve of a rotary control valve employing the distributor circuit shown in FIG. 1.

Referring to FIGS. 3 to 6, it will be explained how the fluid flow distributor circuit 14 is defined between two relatively displaceable valve elements, namely a valve sleeve 22 and an inner valve 23, of a rotary control valve of the conventional type. FIG. 3 shows the valve sleeve 22 with the inner valve 23 positioned therein.

Figure 4:
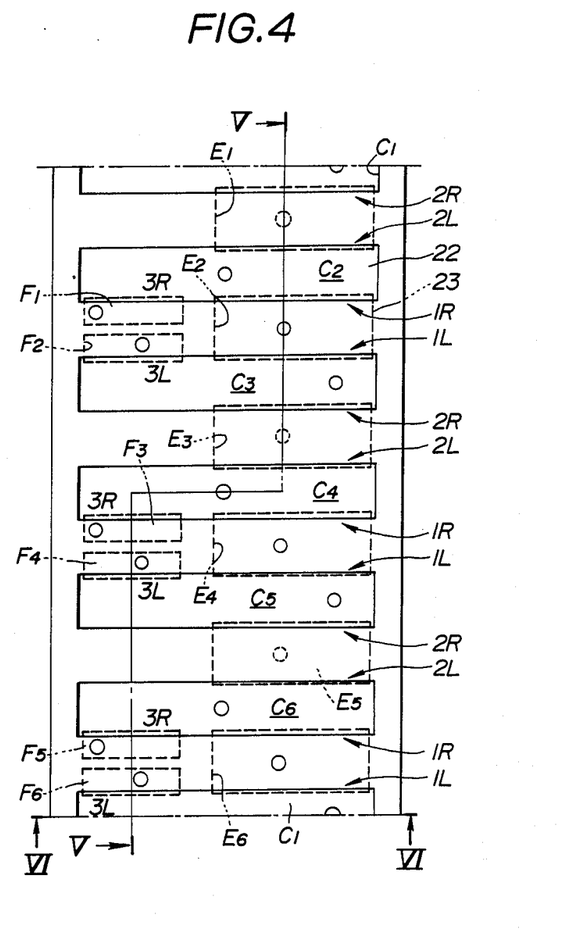
FIG. 4 is a diagram developed according to a longitudinal section IV—IV of FIG. 3.
Figure 5:
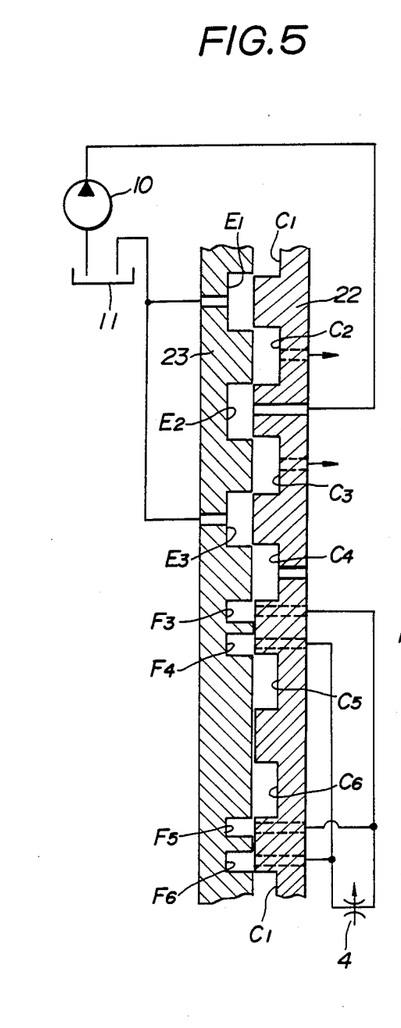
FIG. 5 is a section along the line V—V of FIG. 4.
Figure 6:
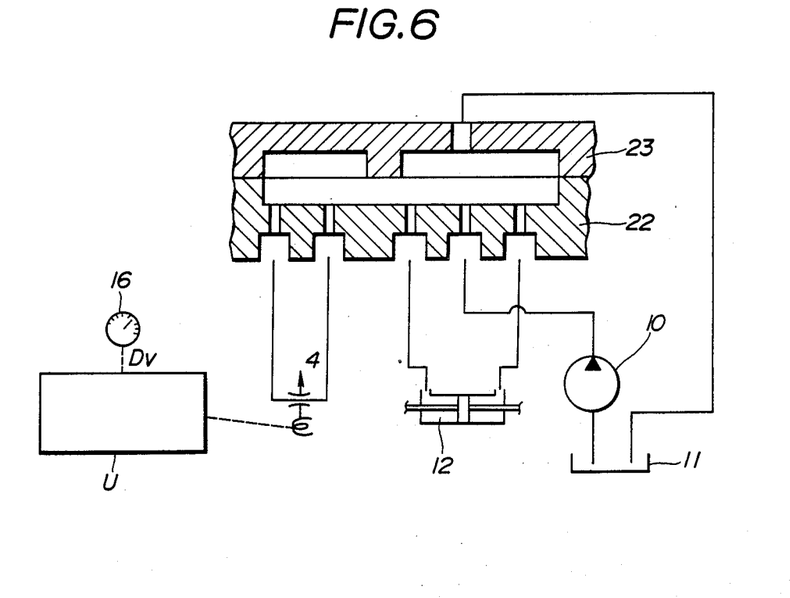
FIG. 6 is a section along the line VI—VI of FIG. 4.

FIG. 4 is a diagram developed according to a longitudinal section IV—IV of FIG. 3. In FIG. 4, there are illustrated by solid lines six longitudinally extending blind ended inner grooves $C_1$ to $C_6$ formed in the inner cylindrical wall of the valve sleeve 22 in relation to six longitudinally extending blind ended main grooves $E_1$ to $E_6$ formed in the outer peripheral wall of the inner sleeve 23. FIG. 5 is a diagram cross sectioned along the line V—V of FIG. 4, and FIG. 6 is a diagram cross sectioned along the line VI—VI of FIG. 4.

As will be readily understood from FIGS. 4 and 5, the inner grooves $C_1$ to $C_6$ are angularly spaced one after another and separated by lands. Among them, the inner grooves $C_2$, $C_4$ and $C_6$ are connected to the right cylinder chamber 12R of the power cylinder 12, while the other three inner grooves $C_1$, $C_3$ and $C_5$ are connected to the left cylinder chamber 12L of the power cylinder 12. Each of the main grooves $E_1$ to $E_6$ lies opposite one land of the valve sleeve 22 separating the adjacent two inner grooves. Among them, the three main grooves $E_2$, $E_4$ and $E_6$ face ports opening at the opposite lands of the valve sleeve 22, respectively, which ports are connected to the pump 10. The other three main grooves $E_1$, $E_3$ and $E_5$ are connected to the fluid reservoir 11. In the central rest position of the rotary valve as illustrated in FIG. 4, the main groove $E_1$ overlaps the adjacent inner grooves $C_1$ and $C_2$, the main grooves $E_2$ overlaps the adjacent inner grooves $C_2$ and $C_3$, the main groove $E_3$ overlaps the adjacent inner grooves $C_3$ and $C_4$, the main groove $E_4$ overlaps the adjacent inner grooves $C_4$ and $C_5$, the main groove $E_5$ overlaps the adjacent inner grooves $C_5$ and $C_6$, and the main groove $E_6$ overlaps the adjacent inner grooves $C_6$ and $C_1$, thus providing unrestricted balanced flow of fluid between fluid inlet main grooves $E_2$, $E_4$ and $E_6$ and fluid return main grooves $E_1$, $E_3$ and $E_5$.

It will now be explained how the variable flow orifices 1R, 1L, 2R and 2L are formed during the relative displacement of the inner valve 23 with regard to the valve sleeve 22. In this case, three sets of such variable flow orifices are formed and arranged equi-angularly spaced. More specifically, three variable flow orifices 1R are formed between the mating edges of the main groove $E_2$ and the inner groove $C_2$, between the mating edges of the main groove $E_4$ and the inner groove $C_4$, and between the mating edges of the main groove $E_6$ and the inner groove $C_6$. Three variable flow orifices 1L are formed between the mating edges of the main groove $E_2$ and the inner groove $C_3$, between the mating edges of the main groove $E_4$ and the inner groove $C_5$, and between the mating edges of the main groove $E_6$ and the inner groove $C_1$. The three variable flow orifices 2R are formed between the mating edges of the main groove $E_1$ and the inner groove $C_1$, between the mating edges of the main groove $E_3$ and the inner groove $C_3$, and between the mating edges of the main groove $E_5$ and the inner groove C . The three variable flow orifices 2L are formed between the mating edges of the main groove $E_1$ and the inner groove $C_2$, between the mating edges of the main groove $E_3$ and the inner groove $C_4$, and between the mating edges of the main groove $E_5$ and the inner groove $C_6$. It will be appreciated that N sets of parallel flow paths $L_2$-$L_3$ and $L_1$-$L_4$ are formed with $2 \times N$ numbers of longitudinally extending inner grooves formed in the cylindrical inner wall of the valve sleeve 22 and $2 \times N$ numbers of longitudinally extending main grooves formed in the outer peripheral wall of the inner valve 23.

For modulating the valve characteristics, there are formed in the outer peripheral wall of the inner valve 23 six longitudinally extending auxiliary grooves $F_1$ to $F_6$ each of which has one edge mating with the adjacent one of the edges of the inner grooves $C_1$-$C_6$ to form three sets of variable flow orifices 3R and 3L. More specifically, the three variable flow orifices 3R are formed between the mating edges of the auxiliary groove $F_1$ and the inner groove $C_2$, between the mating edges of the auxiliary groove $F_3$ and the inner groove $C_4$, and between the mating edges of the auxiliary groove $F_5$ and the inner groove $C_6$. The three variable flow orifices 3L are formed between the mating edges of the auxiliary groove $F_2$ and the inner groove $C_3$, between the mating edges of the auxiliary groove $F_4$ and the inner groove $C_5$, and between the mating edges of the auxiliary groove $F_6$ and the inner groove $C_1$. As will be understood from FIG. 5, the three parallel auxiliary grooves $F_1$, $F_3$ and $F_5$ are connected via the externally controlled variable flow orifice valve 4 to the other three parallel auxiliary grooves $F_2$, $F_4$ and $F_6$.

From the above description, it will now be understood that the three sets of variable flow orifices 3R and 3L required for modulation of the valve characteristics are formed by six auxiliary grooves $F_1$ to $F_6$ formed in the outer peripheral wall of the inner valve 23 without increasing the number of inner grooves to be formed in the inner wall of the valve sleeve 22. Obviously, if N sets of bypass passages are required, the number of the auxiliary grooves to be formed in the outer peripheral wall of the inner valve 23 amounts to $2 \times N$.

In FIGS. 4 and 5, the rotary valve is illustrated in its central neutral position. Under this condition, assuming that the externally controlled variable flow orifice valve 4 is fully closed when the vehicle speed is zero or substantially zero, fluid under pressure from the pump 10 is divided evenly through the variable flow orifices 1R and 2L in one direction and through the variable flow orifices 1L and 2R in the opposite direction. The pressure drops at the level of flow restrictions provided by these orifices are, under this condition, substantially nil. The rotary valve thus has no effect on the power cylinder 12 and thus no effect on the steering system.

In the central rest position, assuming that the externally controlled variable flow orifice valve 4 is fully opened to provide the maximum orifice area thereof during operation of the vehicle at a sufficiently high speed (see FIG. 2(d)), fluid under pressure from the pump 10 is divided evenly through the variable flow orifices 1R and 2L in one direction and through the variable flow orifices 1L and 2R in the opposite direction since there occurs no fluid pressure difference across the bypass path L5 (see FIG. 1). The rotary valve thus has no effect on the power cylinder 12 and thus no effect on the steering system.

Figure 7:
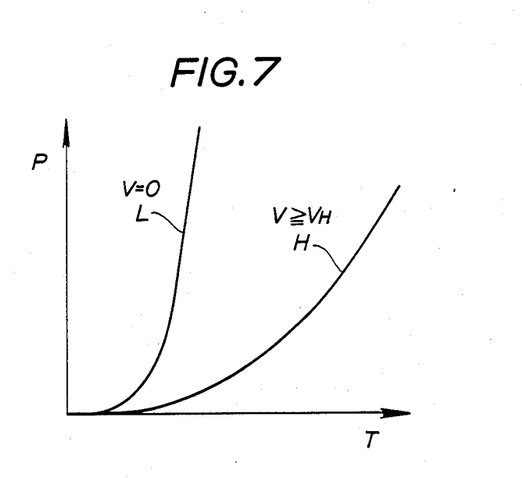
FIG. 7 is a chart showing power assist vs., steering torque characteristic curves for low vehicle and high vehicle speed.

In turning the steering wheel 15 at zero or substantially zero vehicle speeds, there is accordingly a relative displacement of the inner valve 23 with respect to the valve sleeve 22. In the case of a displacement of the inner valve 23 in a clockwise direction, e.g., towards the bottom in FIG. 6, the variable flow orifices 1R and 2R effect a throttling of the fluid path inducing a pressure drop which in turn results in a pressure increase in the right cylinder chamber 12R of the power cylinder 12. The variable flow orifices 2L open simultaneously proportionally and thus the left cylinder chamber 12L is in substantially in direct communication with the fluid reservoir 11. Thus, there is created between the right and left cylinder chambers 12R and 12L a pressure differential causing the rod of the power cylinder 12 to displace towards the left. The variable flow orifice 3R effects a throttling of the fluid path simultaneously, but since the orifice valve 4B is closed when the vehicle speed is zero or substantially zero, this throttling effected by the variable flow orifice 3R has no effect on the creation of the pressure differential. The hydraulic pressure P applied to the right cylinder chamber 12R (i.e., a power assist) against the displacement of the inner valve 23 (i.e., a steering torque T) at zero vehicle speed (V=0) is illustrated by a characteristic curve L in FIG. 7. The shape of the curve L represents high levels of power assist at zero vehicle speed. In determining the shape of this curve L, the orifice area ($A_2$) vs., steering torque (T) characteristic (see FIG. 2(b)) of the variable flow orifice 2R (or 2L) plays a major role.

If, on the contrary, the steering wheel 15 is turned to cause a relative displacement of the inner valve 23 in a counterclockwise direction at zero or substantially zero vehicle speeds, the variable flow orifices 1L and 2L effect a throttling of the fluid path inducing a pressure drop which in turn results in a pressure increase in the left cylinder chamber 12L of the power cylinder 12. The right cylinder chamber 12R is in direct communication with the fluid reservoir 11 via the variable flow orifices 2L which open simultaneously proportionally.

Let us now consider how the rotary valve works at a high vehicle speed above a predetermined level $V_H$. The orifice area $A_4$ of the variable flow orifice valve 4 is maximum as shown in FIG. 2(d) regardless of variation of steering torque T. If the steering wheel 15 is turned clockwise during operation of the vehicle at such a high vehicle speed, there is accordingly a displacement of the inner valve 23 in a clockwise direction, e.g., towards the bottom in FIG. 5, the variable flow orifices 1R, 2R and 3R effect a throttling of the fluid path inducing a less pressure drop which in turn results in a less pressure increase in the right chamber 12R of the power cylinder 12. The variable flow orifices 2L and 3L open simultaneously proportionally and thus the left cylinder chamber 12L is in substantially in direct communication with the fluid reservoir 11. Since there is a fluid flow through the bypass path $L_5$, namely, a fluid flow through the variable flow orifices 3L, 4, 3R and 2L, a pressure drop is less than a pressure drop induced by the variable flow orifices 2R alone and this results in a less pressure increase in the right cylinder chamber 12R with the same displacement of the inner valve 23. The increase of pressure P (i.e., a power assist) against steering torque T at vehicle speeds higher than $V_H$ is illustrated by a characteristic curve H in FIG. 7. As shown in FIG. 2(c), as steering torque T increases, the orifice area $A_3$ of the variable flow orifice 3R (or 3L) decreases at a rate less than a rate at which the orifice area $A_2$ decreases, and after the steering torque T has increased beyond a predetermined value $T_2$, the orifice area $A_3$ decreases at a further less rate. The shape of the characteristic curve H is determined by the variable flow orifice 3R (or 3L) in cooperation with the variable flow orifice 2R (or 2L). Thus, any desired high vehicle speed power assist characteristic may be obtained by suitably designing the orifice varying characteristics of the variable flow orifice 3R (or 3L).

In turning the steering wheel 15 during operation of the vehicle at an intermediate speed that is below the predetermined vehicle speed $V_H$, the variable flow orifice valve 4 opens under the control of the control unit U supplied with the output of the vehicle speed sensor 16 to provide an orifice area corresponding to a vehicle speed detected. In the event of a clockwise turning of the steering wheel 15 and thus a clockwise displacement of the inner valve 23, e.g., a displacement toward the bottom in FIG. 5, the variable flow orifices 3R in series with the orifice valve 4B decrease their orifice areas although the variable flow orifices 3L are opened simultaneously and proportionally, and thus the serially connected variable flow orifices 3R and 4 effect a throttling of fluid path bypassing the variable flow orifices 2R modulating a pressure increase, in the right cylinder chamber 12R, resulted from a pressure drop induced by a throttling of the fluid path effected by the variable flow orifices 2R alone. The manner of modulation is such that with the same steering torque, the hydraulic fluid pressure in the cylinder chamber of the power cylinder 12 or power assist decreases as the vehicle speed increases, and at the same vehicle speed, the power assist increases as the steering torque increases. Thus, the power assist characteristic curves at intermediate vehicle speeds can be drawn between the two characters tic curves L and H in FIG. 7 and thus the power assist gradually decreases as the vehicle speed increases even though sufficient power assist is secured in response to a relatively large steering torque.

Figure 8:
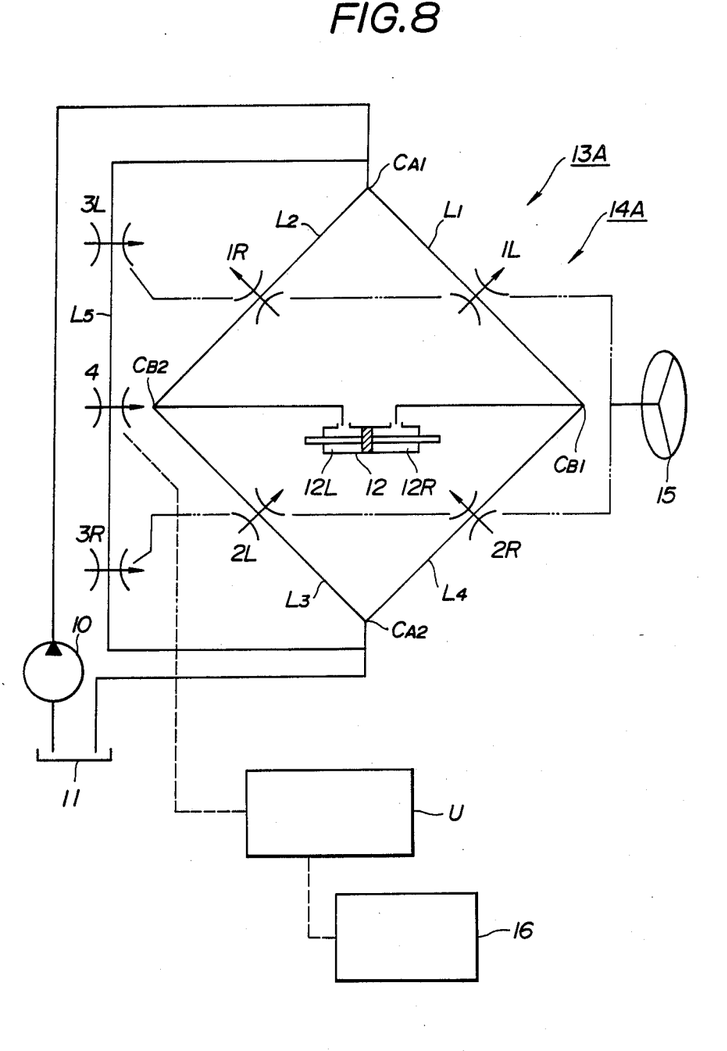
FIG. 8 is a circuit diagram of a second embodiment.

Referring to FIGS. 8, a second embodiment of a control valve 13A employing a fluid flow distributor circuit 14A is described. In this Figure and FIG. 1, the same reference numerals are used to designate similar parts. Comparing FIG. 8 with FIG. 1, it will be readily understood that the fluid distributor circuit 14A is different from its counterpart in that a bypass path $L_5$, including a variable flow orifice 3L, an externally controlled variable flow orifice valve 4 and a variable flow orifice 3R arranged in this order, is connected between a pump 10 and a fluid reservoir 11 bypassing two parallel fluid flow paths $L_2$-$L_3$ and $L_1$-$L_4$. The operation and effects provided by this second embodiment are the same as those provided by the first embodiment.

Figure 9:
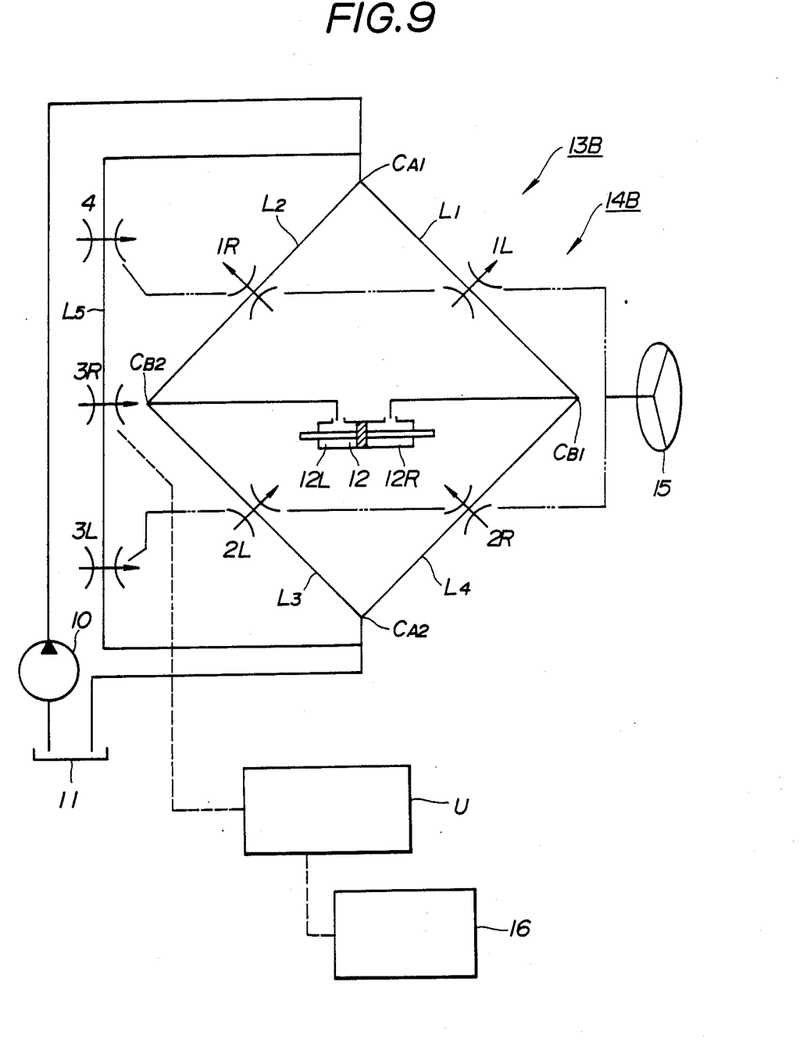
FIG. 9 is a circuit diagram of a third embodiment.

Referring to FIG. 9, a third embodiment of a control valve 13B employing a modified fluid flow distributor circuit 14B is described. The fluid distributor circuit 14B is different from that shown in FIG. 8 in the order of arrangement of variable flow orifices 3R and 3L and an externally controlled variable flow orifice valve 4 in a bypass path $L_5$. In this embodiment, the variable flow orifice valve 4, the variable flow orifice 3R and the variable flow orifice 3L in this order with respect to fluid flow through the bypass path $L_5$.

Although in the fluid distributor circuits 14, 14A and 14B, three examples of order of arrangement of two variable flow orifices 3R, 3L and the externally controlled variable flow orifice valve 4 in the bypass path $L_5$ have been illustrated, they may be arranged in any desired order as long as they are arranged in series in the bypass path.

Figure 10:
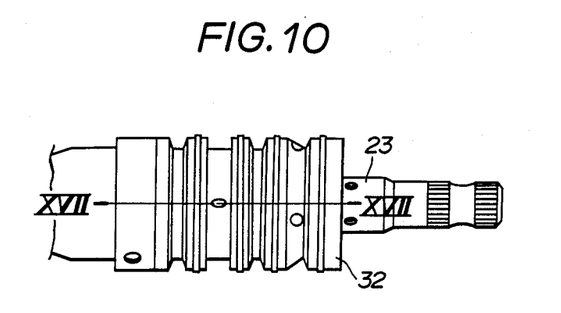
FIG. 10 is a side elevation of a valve sleeve with an inner valve of a rotary control valve employing the distributor circuit shown in FIG. 9.
Figure 11:
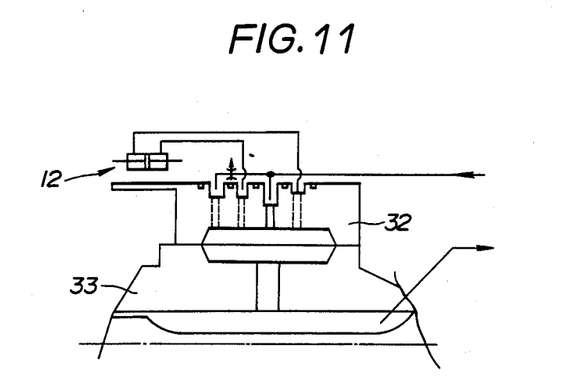
FIG. 11 is a diagram cross sectioned along the line X—X of FIG. 12.

Referring to FIGS. 10-13, a rotary type control valve embodying the fluid distributor circuit shown in FIG. 9 is described. FIG. 10 is a side elevation of a valve sleeve 32 with an inner valve 33 which is relatively displaceable with regard to the valve sleeve 32 to define therebetween three sets of fluid distributor circuits as shown in FIG. 9.

Figure 12:
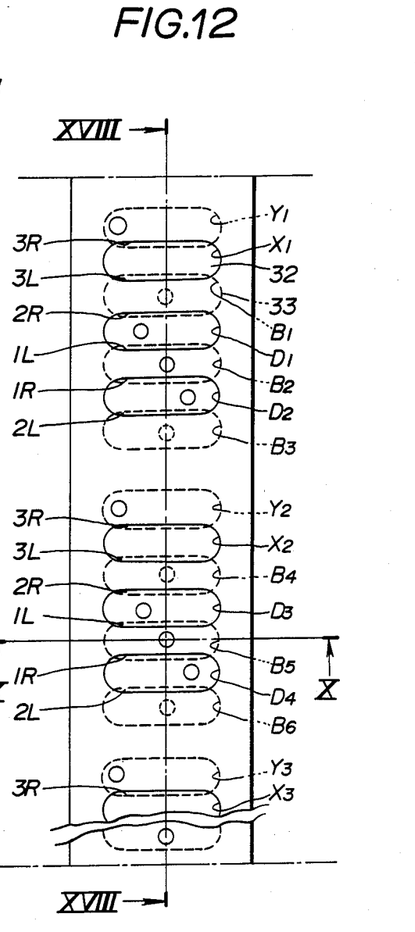
FIG. 12 is a diagram developed according to a longitudinal section XVII—XVII of FIG. 10.

FIG. 12 is a diagram developed according to a longitudinal section XVII—XVII of FIG. 10.

Figure 13:
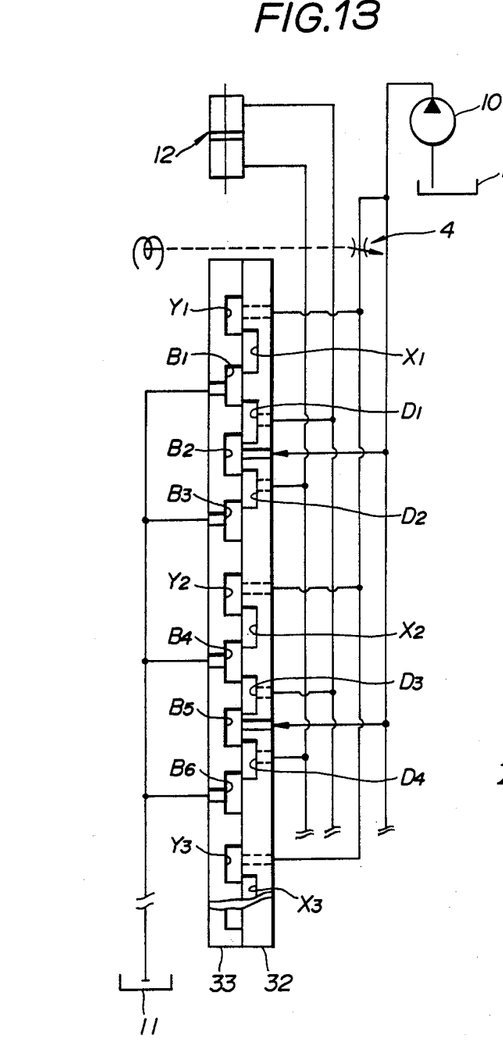
FIG. 13 is a section along the line XVIII—XVIII of FIG. 12.

As will be readily understood from FIGS. 12 and 13, the valve sleeve 32 has formed in an inner wall thereof six longitudinally extending inner grooves, although only four of them being shown at $D_1$ to $D_4$, and three longitudinally extending inner connection grooves $X_1$ to $X_3$ which are angularly spaced one after another and separated by lands. In FIG. 13, the inner grooves $D_1$ and $D_3$ are connected to the right cylinder chamber 12R of the power cylinder 12, while the inner grooves $D_2$, and $D_4$ are connected to the left cylinder chamber 12L of the power cylinder 12. Formed in the outer peripheral wall of the inner valve 33 are nine main grooves, although only six of them being designated at $B_1$ to $B_6$ in FIGS. 12 and 13, and three auxiliary grooves $Y_1$ to $Y_3$. These grooves formed in the outer peripheral wall of the valve sleeve 33 are angularly spaced one after another and separated by lands.

In FIG. 13, each of the inner grooves $D_1$ to $D_4$ lies opposite one land of the inner valve 33 separating the adjacent two main grooves $B_1$ to $B_6$. Regarding the main grooves $B_1$ to $B_6$, the main grooves $B_2$ and $B_5$ face ports opening at the opposite lands of the valve sleeve 22, respectively, which ports are connected to the pump 10. The main grooves $B_1$, $B_3$, $B_4$ and $B_6$ are connected to the fluid reservoir 11. In the central rest position of the rotary valve as illustrated in FIGS. 12 and 13, the inner groove $D_1$ overlaps the adjacent main grooves $B_1$ and $B_2$, the inner grooves $D_2$ overlaps the adjacent main grooves $B_2$ and $B_3$, the inner groove $D_3$ overlaps the adjacent main grooves $B_4$ and $B_5$, and the inner groove $D_4$ overlaps the adjacent main grooves $B_5$ and $B_6$ thus providing unrestricted balanced flow of fluid between fluid inlet main grooves $B_2$ and $B_5$ and fluid return main grooves $B_1$, $B_3$, $B_4$ and $B_6$.

It will now be explained how the variable flow orifices 1R, 1L, 2R and 2L are formed during the relative displacement of the inner valve 33 with regard to the valve sleeve 32. In this case, three sets of such variable flow orifices are formed and arranged equi-angularly spaced. However, in FIGS. 12 and 13, only two sets of them are completely illustrated. Specifically, two variable flow orifices 1R are formed between the mating edges of the inner groove $D_2$ and the main groove $B_2$, and between the mating edges of the inner groove $D_4$ and the main groove $B_5$. Two variable flow orifices 1L are formed between the mating edges of the inner groove $D_1$ and the main groove $B_3$, and between the mating edges of the inner groove $D_3$ and the main groove $B_5$. The two variable flow orifices 2R are formed between the mating edges of the inner groove $D_1$ and the main groove $B_1$, and between the mating edges of the inner groove $D_3$ and the main groove $B_4$. The two variable flow orifices 2L are formed between the mating edges of the inner groove $D_2$ and the main groove $B_3$, and between the mating edges of the inner groove $D_4$ and the main groove $B_6$.

For modulating the valve characteristics, the three auxiliary grooves $Y_1$, $Y_2$ and $Y_3$ formed in the outer peripheral wall of the inner valve 23 and three inner connection grooves $X_1$, $X_2$ and $X_3$ are formed in the inner wall of the valve sleeve 32. The auxiliary grooves $Y_1$-$Y_3$ lie opposite to the lands and facing ports opening to these lands, which ports are connected to the pump 10 via an externally controlled variable orifice valve operated by a solenoid actuator. Each of the inner connection grooves $X_1$ to $X_3$ lie opposite to the land separating one of the auxiliary grooves $Y_1$ to $Y_3$ from the adjacent fluid return main groove, e.g., $B_1$, $B_4$, and overlaps both grooves. More specifically, the three variable flow orifices 3R are formed between the mating edges of the inner connection groove $X_1$ and the auxiliary groove $Y_1$, between the mating edges of the inner connection groove $X_2$ and the auxiliary groove $Y_2$, and between the mating edges of the inner connection groove $X_{3y}$ and the auxiliary groove $Y_3$. The three variable flow orifices 3L are formed. Only two of them are illustrated in FIGS. 12 and 13. They are formed between the mating edges of the inner connection groove $X_1$ and the fluid return main groove $B_1$, and between the mating edges of the inner connection groove $X_2$ and the fluid return main groove $B_4$. From the preceding description, it will now be understood that when the externally controlled variable flow orifice valve 4 is opened, fluid from the pump 10 is also supplied to the auxiliary grooves $Y_1$ to $Y_3$, and the fluid supplied to these auxiliary grooves flow into the fluid return main grooves, e.g., $B_1$, $B_4$, passing through the serially arranged variable flow orifices 3L and 3R.

It will be appreciated now that in order to form three sets of fluid distributor circuits nine grooves of generally the same configuration are formed in the inner wall of the valve sleeve and twelve grooves of generally the same configuration are formed in the outer peripheral wall of the inner valve 33. If it is desired to decrease the number of the inner grooves formed in the inner wall of the valve sleeve 32 and the main and auxiliary grooves formed in the outer peripheral wall of the inner valve 33, the auxiliary grooves $Y_2$ and $Y_3$ and the inner connection grooves $X_2$ and $X_3$ may be removed.

Figure 14:
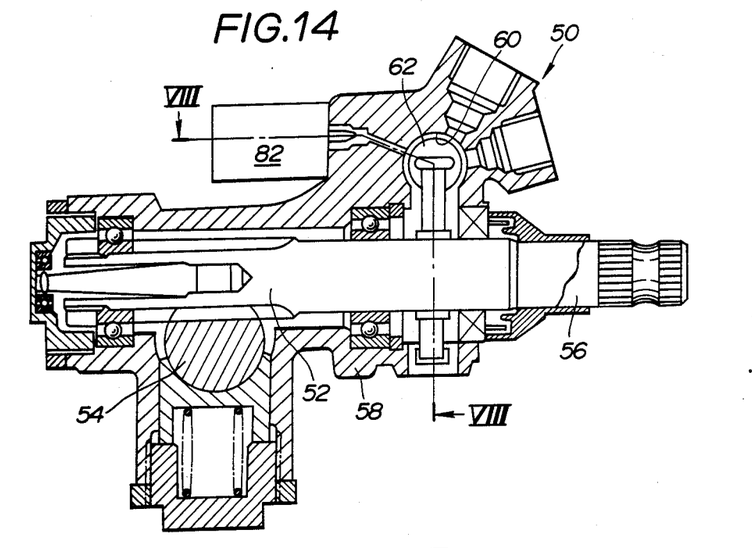
FIG. 14 is a sectional diagram of a spool type control valve.
Figure 15:
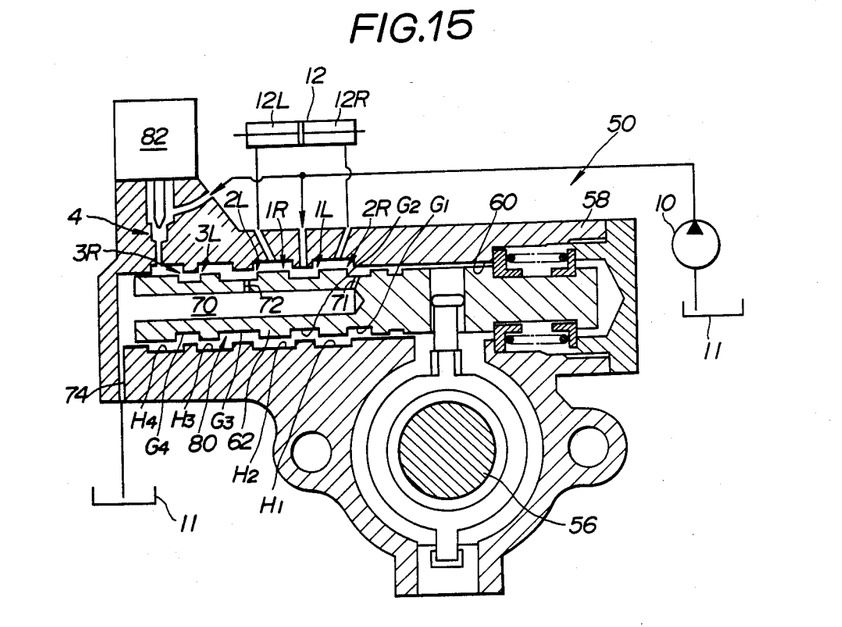
FIG. 15 is a section along the line VIII—VIII of FIG. 14.

Referring lastly to FIGS. 14 and 15, there is shown a spool type control valve embodying the distributor circuit 14B shown in FIG. 9. Reference numeral 52 designates a pinion which engages a rack 54 of a steering system. The pinion 52 is formed at one end portion of a steering torque input shaft 56 that is rotatably supported in a housing 58. The housing 58 includes a valve bore 60 receiving a valve spool 62. In FIG. 15, the spool 62 displaces longitudinally as the steering input shaft 56 displaces from the illustrated central rest position angularly. For example, a clockwise displacement of the shaft 56 relative to the housing 58 causes a displacement of the spool 62 to the right relative to the bore 60. Formed in the inner wall of the valve bore 60 are a first set of two annular inner grooves $H_1$ and $H_2$ which are axially spaced and separated by a land, and a second set of two annular inner grooves $H_3$ and $H_4$ which are axially spaced and separated by a land. Formed in the outer peripheral wall of the spool 62 are three cicrumferentially extending main grooves $G_1$, $G_2$ and $G_3$, and a circumferentially extending auxiliary groove $G_4$. These grooves $G_1$ to $G_4$ are spaced longitudinally and separated by lands. The spool 62 is formed with an axial drain bore 70 and two radial passages 71 and 72 opening to the axial bore 70. The main groove $G_2$ is connected to a pump 10 to receive fluid under pressure. In the illustrated central rest position of the control valve 50, the main groove $G_2$ lies opposite the land of the valve bore 60 separating the inner grooves $H_1$ and $H_2$ and overlaps the inner grooves $H_1$ and $H_2$. The inner groove $H_1$ overlaps the adjacent main grooves $G_1$ and $G_2$, while the inner groove $H_2$ overlaps the main grooves $G_2$ and $G_3$. The mating edges of the inner groove $H_2$ and the main groove $G_2$ form a variable flow orifice 1R, while the mating edges of the inner groove $H_1$ and the main groove $G_2$ form a variable flow orifice 1L. The inner groove $H_1$ overlaps the main grooves $G_1$ and $G_2$ and connected to a right cylinder chamber 12R of a power cylinder 12, while the inner groove $H_2$ overlaps the main grooves $G_2$ and $G_3$ and connected to a left cylinder chamber 12L of the power cylinder 12. A variable flow orifice 2R is formed between the mating edges of the main groove $G_1$ and the inner groove $H_1$, while a variable flow orifice 2L is formed between the main groove $G_3$ and the inner groove $H_2$. Respectively via the radial passages 71 and 72, the main grooves $G_1$ and $G_3$ are connected to the axial bore 70 that in turn connected via a radial passage 74 to a fluid reservoir 11. The auxiliary groove $G_4$ overlaps the inner grooves $H_3$ and $H_4$. The mating edges of the auxiliary groove $G_4$ and the inner groove $H_4$ form a variable flow orifice 3R, while the mating edges of the auxiliary groove $G_4$ and the inner groove $H_3$ form a variable flow orifice 3L. The variable flow orifices 1R, 1L, 2R, 2L, 3R and 3L have characteristics as shown in FIGS. 2(a), 2(b) and 2(c), respectively. The mating edges of the main groove $G_3$ and the inner groove $H_3$ form a clearance 80 which provides an unrestricted fluid path during operation of the control valve 50 The inner groove $H_4$ is connected via an externally controlled variable flow orifice 4 to the oil pump 10. The externally controlled variable flow orifice valve 4 is actuated by a solenoid actuator 82.

In the previously described examples, vehicle speed is detected and used as a variable on which the control unit U controls electric current passing through the solenoid operated actuator for the externally controlled variable flow orifice valve 4. More particularly, the externally controlled variable flow orifice valve 4 open simultaneously proportionally as vehicle speed increases.

If desired, the externally controlled orifice valve 4 may be controlled in response to some other variable related to a driver's preference or mode of operation of the vehicle. For this end, a manually operable selector is disposed near the vehicle driver's seat and a control unit is supplied with the output of the manual selector such that the driver can vary electric current passing through a solenoid actuator for an externally controlled variable orifice valve 4 until the level of a power assist fits his/her preference.

Some other variable related to a road friction coefficient may be used for controlling orifice area of the externally controlled variable flow orifice valve 4. One example of a sensor to detect such variable is a switch coupled to a vehicle's wiper switch. In this case, the solenoid current increases as wiper speed increases, thus decreasing the level of power assist in response to wiper speed. This is advantageous because it is the common behaviour of a vehicle' driver to increase the wiper speed as rain fall gets heavier. A rain drop sensor may be used as a road friction coefficient sensor. It is possible to detect road friction coefficient by computing a difference in rotation between a traction road wheel and a non-traction road wheel or directly detect road friction coefficient by detecting the amount of splash by a traction road wheel. In using the variable related to the road friction coefficient, it is also possible to modify the solenoid current that is determined based on vehicle speed in response to the friction coefficient.

The solenoid current may be varied to modify the orifice area vs., vehicle speed characteristics shown in FIG. 2(b) in response to frequency of acceleration and deceleration which the vehicle is subject to. The solenoid current may be varied in accordance with judgment made based on steering wheel angle and speed at which the steering wheel is turned. Lastly, the solenoid current may be varied in response to load imposed on the vehicle dirigible road wheels.

What is claimed is:

1. A variable assist power steering system for vehicles including a hydraulic fluid source, a fluid reservoir, and a hydraulic pressure operated power cylinder adapted to be connected to a steering linkage, comprising:

a control valve including valve elements relatively displaceable in response to a first predetermined variable to define therebetween two parallel fluid flow paths connected between the fluid source and the fluid reservoir to produce a pressure difference in the power cylinder in response to said first predetermined variable, wherein said control valve comprises a bypass path provided with variable flow orifice means for providing a throttle of fluid flow through said bypass path in response to said first predetermined variable, and an externally controlled variable flow orifice valve that has an orifice area variable in response to a second predetermined variable which is different from said predetermined variable.

2. A variable assist power steering system as claimed in claim 1, wherein said variable flow orifice means include two kinds of variable flow orifices which have orifice areas variable in opposite directions in response to variation of said first predetermined variable, and said variable flow orifices and said externally controlled variable flow orifice valve of said bypass path are connected in series.

3. A variable assist power steering system as claimed in claim 2, wherein said bypass path has one end connected to one cylinder chamber of the power cylinder and an opposite end connected to the other cylinder chamber of the power cylinder.

4. A variable assist power steering system as claimed in claim 2, wherein said bypass path is connected between said hydraulic fluid source and the fluid reservoir.

5. A variable assist power steering system as claimed in claim 1, wherein said first predetermined variable is a steering input torque and said second predetermined variable is a vehicle speed.

6. A variable assist power steering system as claimed in claim 1 wherein said control valve comprises as said relatively displaceable valve elements an inner valve and a valve sleeve with a bore receiving said inner valve.

7. A variable assist power steering system as claimed in claim 6, wherein said inner valve has an outer peripheral wall formed with a set of three longitudinally extending main grooves separated by lands, said valve sleeve has an inner wall formed with a set of two longitudinally extending inner grooves lying opposite to said lands of said inner valve, respectively, and overlapping the adjacent two main grooves when said inner valve is in a central rest position with regard to said valve sleeve.

8. A variable assist power steering system as claimed in claim 7, wherein said inner valve includes a set of two auxiliary grooves separated by a land, said two auxiliary grooves overlapping said inner grooves of said set when said inner valve is in the central rest position.

9. A variable assist power steering system as claimed in claim 7, wherein two of said three main grooves are connected to the fluid reservoir, and said inner valve includes an auxiliary groove separated by a land from the adjacent one main groove connected to the fluid reservoir, and said valve sleeve includes an inner connection groove lying opposite said land that separates said auxiliary groove from the adjacent main groove, said auxiliary groove being connected via said externally controlled orifice valve to the fluid source.

10. A variable assist power steering system as claimed in claim 1, wherein said control valve comprises as said relatively displaceable valve elements a valve spool and a valve housing with a bore receiving said spool.

11. A variable assist power steering system as claimed in claim 2, wherein said control valve comprises as said relatively displaceable valve elements a valve spool and a valve housing with a bore receiving said spool.

12. A variable assist power steering system as claimed in claim 3, wherein said control valve comprises as said relatively displaceable valve elements a valve spool and a valve housing with a bore receiving said spool.

13. A variable assist power steering system as claimed in claim 4, wherein said control valve comprises as said relatively displaceable valve elements a valve spool and a valve housing with a bore receiving said spool.

14. A variable assist power steering system as claimed in claim 5, wherein said control valve comprises as said relatively displaceable valve elements a valve spool and a valve housing with a bore receiving said spool.

15. A variable assist power steering system as claimed in claim 6, wherein said control valve comprises as said relatively displaceable valve elements a valve spool and a valve housing with a bore receiving said spool.

16. A variable assist power steering system as claimed in claim 7, wherein said control valve comprises as said relatively displaceable valve elements a valve spool and a valve housing with a bore receiving said spool.

17. A variable assist power steering system as claimed in claim 8, wherein said control valve comprises as said relatively displaceable valve elements a valve spool and a valve housing with a bore receiving said spool.

18. A variable assist power steering system as claimed in claim 9, wherein said control valve comprises as said relatively displaceable valve elements a valve spool and a valve housing with a bore receiving said spool.

* * * * *